United States Patent
Gohil

(10) Patent No.: US 10,419,368 B1
(45) Date of Patent: Sep. 17, 2019

(54) DYNAMIC SCALING OF COMPUTING MESSAGE ARCHITECTURE

(71) Applicant: Sprint Communications Company L.P., Overland Park, KS (US)

(72) Inventor: Jaideepsinh Gohil, Kansas City, KS (US)

(73) Assignee: Spring Communications Company L.P., Overland Park, KS (US)

(*) Notice: Subject to any disclaimer, the term of this patent is extended or adjusted under 35 U.S.C. 154(b) by 0 days.

(21) Appl. No.: 15/937,774

(22) Filed: Mar. 27, 2018

(51) Int. Cl.
*H04L 29/14* (2006.01)
*H04L 12/861* (2013.01)
*H04L 29/08* (2006.01)

(52) U.S. Cl.
CPC ........ *H04L 49/9005* (2013.01); *H04L 69/321* (2013.01); *H04L 67/28* (2013.01)

(58) Field of Classification Search
CPC ... H04L 49/9005; H04L 69/321; H04L 67/28; H04L 69/40; H04L 29/14; H04L 29/06
See application file for complete search history.

(56) References Cited

U.S. PATENT DOCUMENTS

| | | | | |
|---|---|---|---|---|
| 2006/0106941 A1* | 5/2006 | Singhal | ............... | H04L 67/2823 709/238 |
| 2006/0129650 A1* | 6/2006 | Ho | ...................... | H04L 67/2804 709/207 |
| 2018/0314498 A1* | 11/2018 | Hulick | .................... | G06F 9/542 |

* cited by examiner

*Primary Examiner* — Lan-Huong Truong

(57) ABSTRACT

A method of processing data message in a computer system comprising a plurality of message queuing nodes, message processing nodes, and coordinating nodes. The method comprises adding a node to the computing system, determining the IP address and node identity number of the added node by a monitor Java archive (JAR) executing on a coordinating node of the computing system, sending the IP address and node identity number via a Java management extension (JMX) connector client of the monitor JAR to each of the message queuing nodes and message processing nodes via a Java management extension (JMX) connector associated with an MBean of each of the message queuing nodes and message processing nodes, where the MBeans encapsulates a configuration file, whereby each of the configuration files are updated with the IP address and the node identity number of the added message queuing node.

20 Claims, 8 Drawing Sheets

DYNAMIC SCALING OF COMPUTING MESSAGE ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer systems may generate large flows of data. Different computers within the computer system may be used to implement architectural layers of a composite data flow, where the data may flow from a data source to a first layer, from the first layer to a second layer, from the second layer to other layers and ultimately to a final layer. Some of the layers may provide a message queuing function to decouple a lower layer from a higher layer, so the two layers need not synchronize to coordinate the flow of data. For example, a lower layer may push a message to the message queue, where the message comprises some data or information to be processed by a higher layer. The higher layer retrieves the message from the message queue when it is ready to process it. If the message queue is empty, the higher layer waits until another message is available. In this way the lower layer does not have to handshake with the higher layer to pass messages.

SUMMARY

In an embodiment, a method of processing data messages in a computing system is disclosed. The method comprises receiving messages by a plurality of message queuing nodes of the computing system and storing the messages in message queues provided by the message queuing nodes, where each of the message queuing nodes execute a message queuing service and each message queuing service comprises a Java management bean (MBean). MBean encapsulates a message queuing service configuration file that identifies other nodes in the computing system by IP address and node identity number. The method further comprises retrieving messages from the message queues by a plurality of message processing nodes of the computing system. The method further comprises processing the retrieved messages, and delivering these processed messages, where each of the message processing nodes execute a message processing service and each message processing service comprises an MBean that encapsulates a message processing service configuration file that identifies other nodes in the computing system by IP address and node identity number, and adding a message queuing node to the computing system. The method further comprises detecting the addition of the added message queuing node by a monitor Java archive (JAR) executing on a coordinating node of the computing system and determining an IP address and a node identity number of the added message queuing node by the monitor JAR. The method further comprises sending the IP address and the node identity number of the added message queuing node via a Java management extension (JMX) connector client of the monitor JAR to each of the message queuing nodes via a JMX connector associated with the MBean of the message queuing service executing on that node, whereby the message queuing service configuration files of the message queuing services are updated with the IP address and the node identity number of the added message queuing node. The method further comprises sending the IP address and the node identity number of the added message queuing node via a JMX connector client of the monitor JAR to each of the message processing nodes via a JMX connector associated with the MBean of the message processing service executing on that node. By this process, the message processing service configuration files of the message processing services are updated with the IP address and the node identity number of the added message queuing node, and a message queuing layer of the computing system is scaled up.

In another embodiment, a method of processing data messages in a computing system is disclosed. The method comprises receiving messages by a plurality of message queuing nodes of the computing system and storing the messages in message queues provided by the message queuing nodes, where each of the message queuing nodes execute a message queuing service and each message queuing service comprises a Java management bean (MBean). The MBean encapsulates a message queuing service configuration file that identifies other nodes in the computing system by IP address and node identity number. The method further comprises retrieving messages from the message queues by a plurality of message processing nodes of the computing system, processing the retrieved messages, and delivering these processed messages. Each of the message processing nodes execute a message processing service, and each message processing service comprises an MBean that encapsulates a message processing service configuration file that identifies other nodes in the computing system by IP address and node identity number. The method further comprises adding a message processing node to the computing system. The method further comprises detecting the addition of the added message processing node by a monitor Java archive (JAR) executing on a coordinating node of the computing system, determining an IP address and a node identity number of the added message processing node by the monitor JAR, sending the IP address and the node identity number of the added message processing node via a Java management extension (JMX) connector client of the monitor JAR to each of the message queuing nodes via a JMX connector associated with the MBean of the message queuing service executing on that node. The message queuing service configuration files of the message queuing services thereby are updated with the IP address and the node identity number of the added message processing node. The method further comprises sending the IP address and the node identity number of the added message processing node via a JMX connector client of the monitor JAR to each of the message processing nodes via a JMX connector associated with the MBean of the message processing service executing on that node, whereby the message processing service configuration files of the message processing services are updated with the IP address and the node identity number of the added message processing node. Through this process, a message processing layer of the computing system is scaled up.

In yet another embodiment, a method of processing data messages in a computing system is disclosed. The method comprises receiving messages by a plurality of message queuing nodes of the computing system and storing the messages in message queues provided by the message queuing nodes, where each of the message queuing nodes execute a message queuing service and each message queuing service comprises a Java management bean (MBean). The MBean encapsulates a message queuing service configuration file that identifies other nodes in the computing system by IP address and node identity number, retrieving messages from the message queues by a plurality of message processing nodes of the computing system. The method further comprises processing the retrieved messages. The method further comprises delivering these processed messages, where each of the message processing nodes execute a message processing service and each message processing service comprises an MBean that encapsulates a message processing service configuration file that identifies other nodes in the computing system by IP address and node identity number. The method further comprises removing a message queuing node or a message processing node from the computing system. The method further comprises detecting the removal of the message queuing node by a monitor Java archive (JAR) executing on a coordinating node of the computing system and determining an IP address and a node identity number of the removed message queuing node by the monitor JAR. The method further comprises sending the IP address and the node identity number of the removed message queuing node via a Java management extension (JMX) connector client of the monitor JAR to each of the remaining message queuing nodes via a JMX connector associated with the MBean of the message queuing service executing on that node, whereby the message queuing service configuration files of the message queuing services are updated by removing the IP address and the node identity number of the removed message queuing node. The method further comprises sending the IP address and the node identity number of the removed message queuing node via a JMX connector client of the monitor JAR to each of the message processing nodes via a JMX connector associated with the MBean of the message processing service executing on that node, whereby the message processing service configuration files of the message processing services are updated by removing the IP address and the node identity number of the removed message queuing node. By this process a message queuing layer of the computing system is scaled down.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
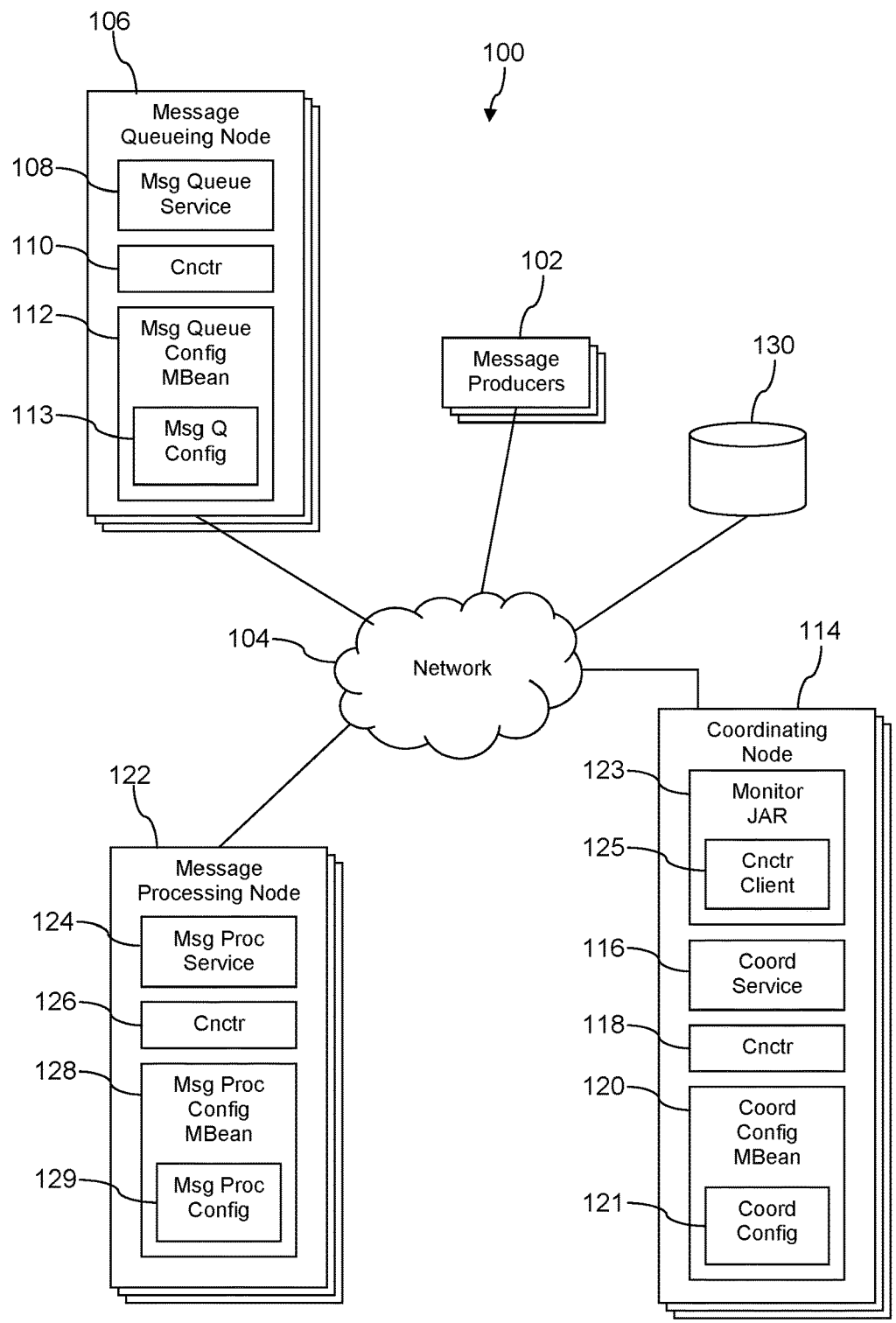
FIG. 1 is an illustration of communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a tiered messaging system that automatically adapts configuration files and causes services to take cognizance of the reconfigured computing nodes as computing nodes are added to the messaging system or removed from the messaging system. The system may receive a heavy stream of data messages from a plurality of producer processes not formally considered part of the system. A message queuing layer receives and queues these messages. A message processing layer, mediated by a coordinating layer, retrieves messages from the message queuing layer and processes these messages before storing them in one or more data stores which are not formally considered part of the system. The producers may be forwarding event messages associated with a large number of mobile communication devices, for example tens of millions of mobile communication devices. The processed messages may be processed by dropping some messages, aggregating other messages, and creating reports that summarize a plurality of other messages. The message queuing layer, the coordinating layer, and the message processing layer each comprise a plurality of computing nodes, and the number of these computing nodes may be increased or decreased as message streaming loads increase or decrease. Computing nodes in the message queuing layer are referred to as message queue nodes, computing nodes in the message processing layer are referred to as message processing nodes, and computing nodes in the coordinating layer are referred to as coordinating nodes. In an embodiment, the computing nodes are provided by a cloud computing system, and the message queuing, coordinating, and message processing functionality is provided by services running on virtual machines provided on the computing nodes.

When a computing node is added or removed from the tiered messaging system, configuration files associated with each of the other computing nodes in the tiered messaging system desirably are updated with the change and the associated service supported by that computing node is caused to take note of the change and adapt its activity accordingly. For example, an IP address and node identity number of the added computing node is added to the configuration files or the IP address and node identity number of the removed computing node is removed from the configuration files and then the services on the remaining computing nodes are adapted to the updated configuration files. For example, lists of messaging queues from which to retrieve messages maintained by message processing services, for example data structures relied upon by the message processing services, may be modified by a dedicated routine or method of the message processing service. For example, lists of message processing queues known to the message queuing service may be modified by routines or methods of the message queuing service. For example, message topics may be redistributed among messaging queues to adapt to a changed number of messaging queues as reflected in the associated configuration files. These adaptations can take place automatically when the configuration files have been completed and each respective service executes a service-specific routine for dynamically adapting to the changed configuration files.

In the past this modification of computing nodes was handled manually by human system administrators or technicians and may have entailed restarting the services. In an example system, there may be about 25 computing nodes running in the message queuing layer, 5 computing nodes running in the mediation layer, and 20 computing nodes running in the message processing layer. The number of computing nodes may diurnally cycle through an increase of computing capacity by adding nodes and a decrease of computing capacity by removing nodes, as the activity of mobile communication devices diurnally cycles through a peak of activity and a minimum of activity. This manual process consumed the time of technicians undesirably and further impeded the responsiveness of the layered messaging system. The present disclosure teaches automatically adapting the configuration files and each service automatically adapting to the changed configuration files without restarting and without the continued involvement of the technician other than to initially trigger the update, for example by adding a new computing node or by removing an existing computing node and notifying a coordinating agent executing in the coordination layer.

A Java archive (JAR) executes on one of a plurality of the coordinating nodes. This JAR may be referred to as a monitor JAR in some contexts herein. The monitor JAR monitors the computing system and the configuration files of each of the computing nodes. When a new node is added to the system or when an existing node is removed from the system, the monitor JAR detects this event and causes the rest of the system to adapt accordingly. When the monitor JAR detects a new node it invokes an application programming interface (API) of a Java management extension (JMX) management bean (MBean) in each of the computing nodes to update a configuration file that is encapsulated in the MBean of each computing node. More specifically, the monitor JAR comprises a JMX connector client that communicates with a JMX connector in a computing node. In an embodiment, the MBeans may register themselves with the JAR as their computing node is added to the system and brought into service.

The monitor JAR sends a message via the JMX connector client to the JMX connector in the computing node where the message identifies the IP address and the node identity number of the added computing node. The JMX connector in the computing node passes this information to the MBean, for example via the intermediary of MBean Server of the computing node. This process causes the configuration file encapsulated by the MBean to be updated. This also entails the service executing on the subject computing node to take cognizance of the revised configuration file and adapt its execution accordingly. The monitor JAR may have a single JMX connector client that communicates with a plurality of different JMX connectors on different computing nodes. Alternatively, the monitor JAR may have a different JMX connector client for each different JMX connector on the different computing nodes. When a computing node is removed from the system (i.e., a computing node is turned off or removed from service) the process works in the same way but the communication from the JMX connector client informs the JMX connector on each computing node that the IP address and the node identity number in the message ought to be removed from the configuration file.

This system promotes system resources tracking current processing demands more faithfully and efficiently. For example, when a human administrator scales the system up or down, they must take into account the time it takes them to step through the process manually, and this implies a time lagging function that does not comport with scaling down as far as might be desirable. Thus, the human user typically over provisions resources, because they fear they cannot scale up timely when demand increases.

The monitor JAR determines additions or deletions of nodes promptly. It promptly determines what queuing nodes it should update with the changes and updates them, serially and promptly. It then promptly determines what processing nodes it should update with the changes and updates them, serially and promptly. This solution does not entail any downtime or maintenance time that interrupts service to a user community.

Turning now to FIG. 1, a system 100 is described. In an embodiment, system 100 comprises a plurality of message producers 102, a network 104, a plurality of message queuing nodes 106, a plurality of coordinating nodes 114, and a plurality of message processing nodes 122. The network 104 comprises one or more public communication networks, one or more private communication networks, or a combination thereof. Each message queuing node 106 comprises a message queuing service 108, a queuing Java management extensions (JMX) connector 110, and a message queuing node configuration MBean 112 that manages a message queuing node configuration file 113. Each coordinating node 114 comprises a coordinating service 116, a coordinating JMX connector 118, and a coordinating node configuration MBean 120 that manages a coordinating node configuration file 121. In an embodiment, one of the coordinating nodes 114 further comprises a monitor Java archive (JAR) 123 that comprises at least one JMX connector client 125. Each message processing node 122 comprises a message processing service 124, a processing JMX connector 126, and a message processing node configuration MBean 128 that manages a message processing node configuration file 121. The MBeans 112, 120, 128 may be said to encapsulate the respective configuration files 113, 121, 129.

Each node 106, 114, 122 may be referred to as a computing node and is a computer system. Computer systems are described hereinafter. Each of the services 108, 116, 124 are provided by one or more applications or computer programs executing on a virtual machine or a plurality of virtual machines on its subject node.

Each of the services 108, 116, 124 learns of other services 108, 116, 124 and nodes 106, 114, 122 and collaborates with them based on a configuration file 113, 121, 129 encapsulated in an MBean 112, 120, 128 local to the node 106, 114, 122 on which it executes. When the configuration file 113, 121, 129 on a node 106, 114, 122 is changed, the service 108, 116, 124 executing on the same node 106, 114, 122 may be adapted based on the now changed configuration file 113, 121, 129, which in turn may alter its collaboration with other nodes 106, 114, 122 in the system 102. For example, a routine of the services may read the changed configuration file and adapt behavior of the service accordingly. In an embodiment, the message queuing service 108 is implemented as a Kafka message queuing service or system. In an embodiment, the message processing service 124 is implemented using Storm. In an embodiment, the coordinating service 116 is implemented using Zookeeper.

The message producers 102 may be applications that execute on computer systems. The message producers 102 send messages relating events which have occurred on or related to mobile communication devices via the network 104 to the message queuing service 108 on the message queuing nodes 106 for storage while waiting for processing by message processing service 124 on the message processing nodes 122. The message producers 102 may receive events from tens of millions of mobile communication devices. The events may comprise signal quality data, cell site signal strength data, requests for a voice service link, requests for a data service link, a URL sent in an HTTP request, a position of the mobile communication device, a blocked call attempt, a dropped call, a hand-off record, and other events. A single mobile communication device may generate 100s or even 1000s of events per day, and these events from tens of millions of devices may be streamed by the message producers 102 into the message queuing service 108.

The message processing service 124 fetches messages enqueued by the message queuing service 108, with the help of the coordinating service 116, and does some processing on the mobile communication device event encapsulated in the fetched messages. This processing may include counting the events by category (e.g., number of dropped calls, number of blocked call attempts, number of successful calls), aggregating separate events into a single event (e.g., multiple events related to a single call combined in a single call record), storing events in storage or in a data store 130, placing the events in long term archival storage.

As the influx of messages from the message producers 102 increases or decreases, the number of computing nodes in the system 100 increases or decreases. When a node 106, 114, 122 is added or removed from the system 100, the on-going services 108, 116, 124 learn of the change through the changes in their respective configuration files 113, 121, 129 and adapt to the change accordingly. In an embodiment, this is accomplished by first modifying the configuration file 110, 118, 126 and then the services 108, 116, 124 execute internal routines that take cognizance of the changed configuration files 110, 118, 126. Formerly the modification of configuration files 110, 118, 126 and restarting of services 108, 116, 124 was handled manually. The present disclosure teaches a specific information technology solution for performing this activity automatically, whereby to reduce the burden on IT staffs, to reduce the opportunities for error, and to make the system 100 scale more rapidly.

When a new computing node is brought up and introduced into the system, the monitor JAR 123 detects the new node and learns its IP address and node identity number. The monitor JAR 123 then updates the configuration files 113, 121, 129 of the message queuing nodes 106, the coordinating nodes 114, and the message processing nodes 122. In each case, this updating is accomplished by the monitor JAR 123 causing the JMX connector client 125 to communicate with a JMX connector 110, 118, 126 in the node 106, 114, 122 providing the IP address and node identity number. The JMX connector 110, 118, 126 invokes an API of the configuration MBean 112, 120, 128 to cause the IP address and the node identity number of the added node to be added to the encapsulated configuration file 113, 121, 129. The service 108, 116, 124 may detect the update to the encapsulated configuration file 113, 121, 129 and execute a routine that adapts the service 108, 116, 124 so as to continue processing going forwards based on the changed configuration files 113, 121, 129. This process works in much the same way when a node 106, 114, 122 is removed from the system 100 (e.g., is turned off or taken out of service), except that in this case the IP address and node identity number are removed from the configuration file 113, 131, 129 rather than added.

Figure 2A:
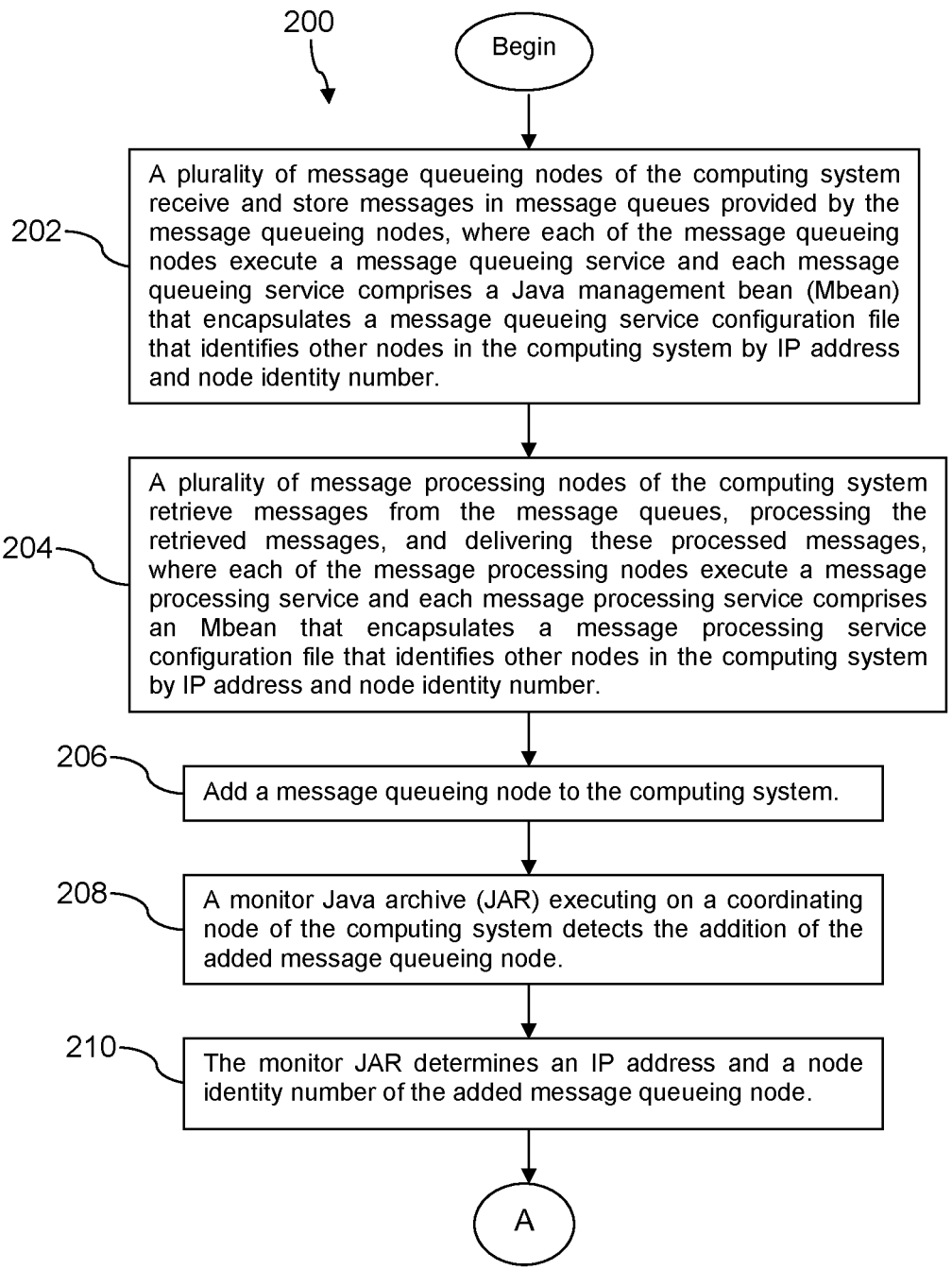
FIG. 2A and FIG. 2B are a flow chart of a method according to an embodiment of the disclosure.
Figure 2B:
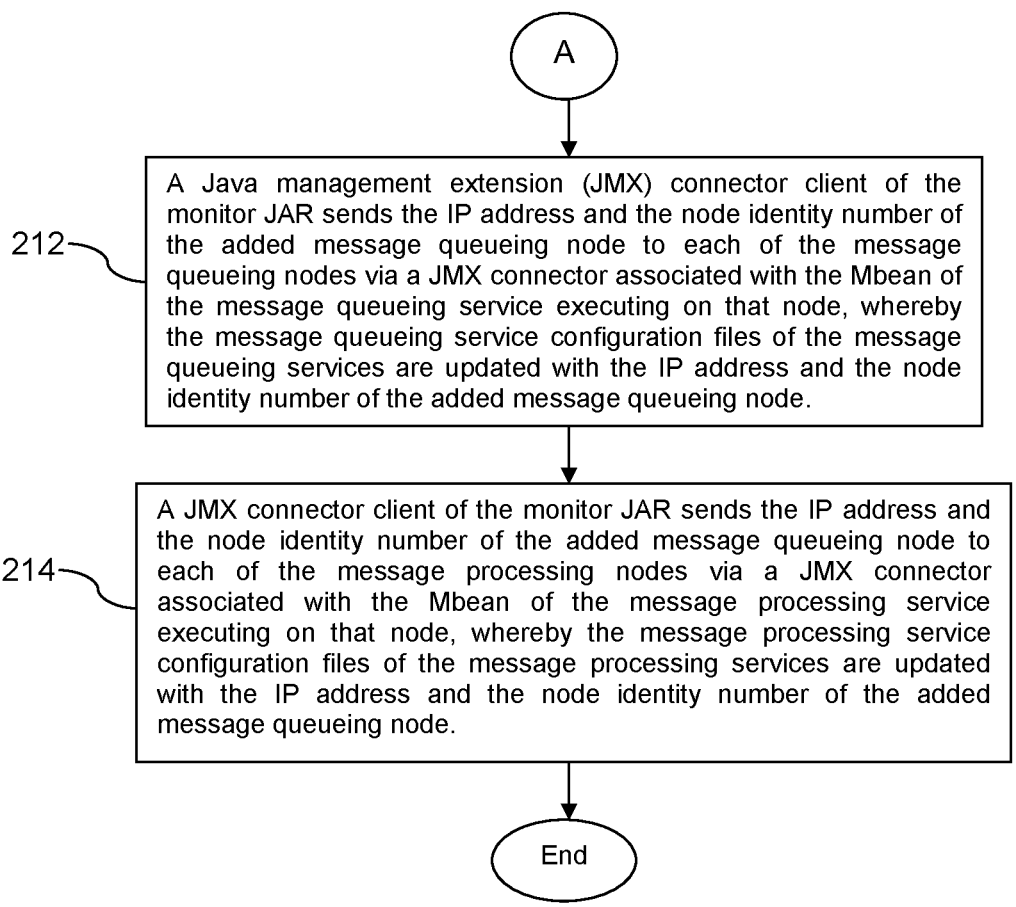

Turning now to FIG. 2A and FIG. 2B, a method 200 is described. At block 202, a plurality of message queuing nodes of the computing system receive and store messages in message queues provided by the message queuing nodes, where each of the message queuing nodes execute a message queuing service and each message queuing service comprises a Java management bean (MBean) that encapsulates a message queuing service configuration file that identifies other nodes in the computing system by IP address and node identity number. At block 204, a plurality of message processing nodes of the computing system retrieve messages from the message queues, processing the retrieved messages, and delivering these processed messages, where each of the message processing nodes execute a message processing service and each message processing service comprises an MBean that encapsulates a message processing service configuration file that identifies other nodes in the computing system by IP address and node identity number.

At block 206, add a message queuing node to the computing system. At block 208, a monitor Java archive (JAR) executing on a coordinating node of the computing system detects the addition of the added message queuing node. At block 210, the monitor JAR determines an IP address and a node identity number of the added message queuing node. At block 212, a Java management extension (JMX) connector client of the monitor JAR sends the IP address and the node identity number of the added message queuing node to each of the message queuing nodes via a JMX connector associated with the MBean of the message queuing service executing on that node, whereby the message queuing service configuration files of the message queuing services are updated with the IP address and the node identity number of the added message queuing node. At block 214, a JMX connector client of the monitor JAR sends the IP address and the node identity number of the added message queuing node to each of the message processing nodes via a JMX connector associated with the MBean of the message processing service executing on that node.

Figure 3A:
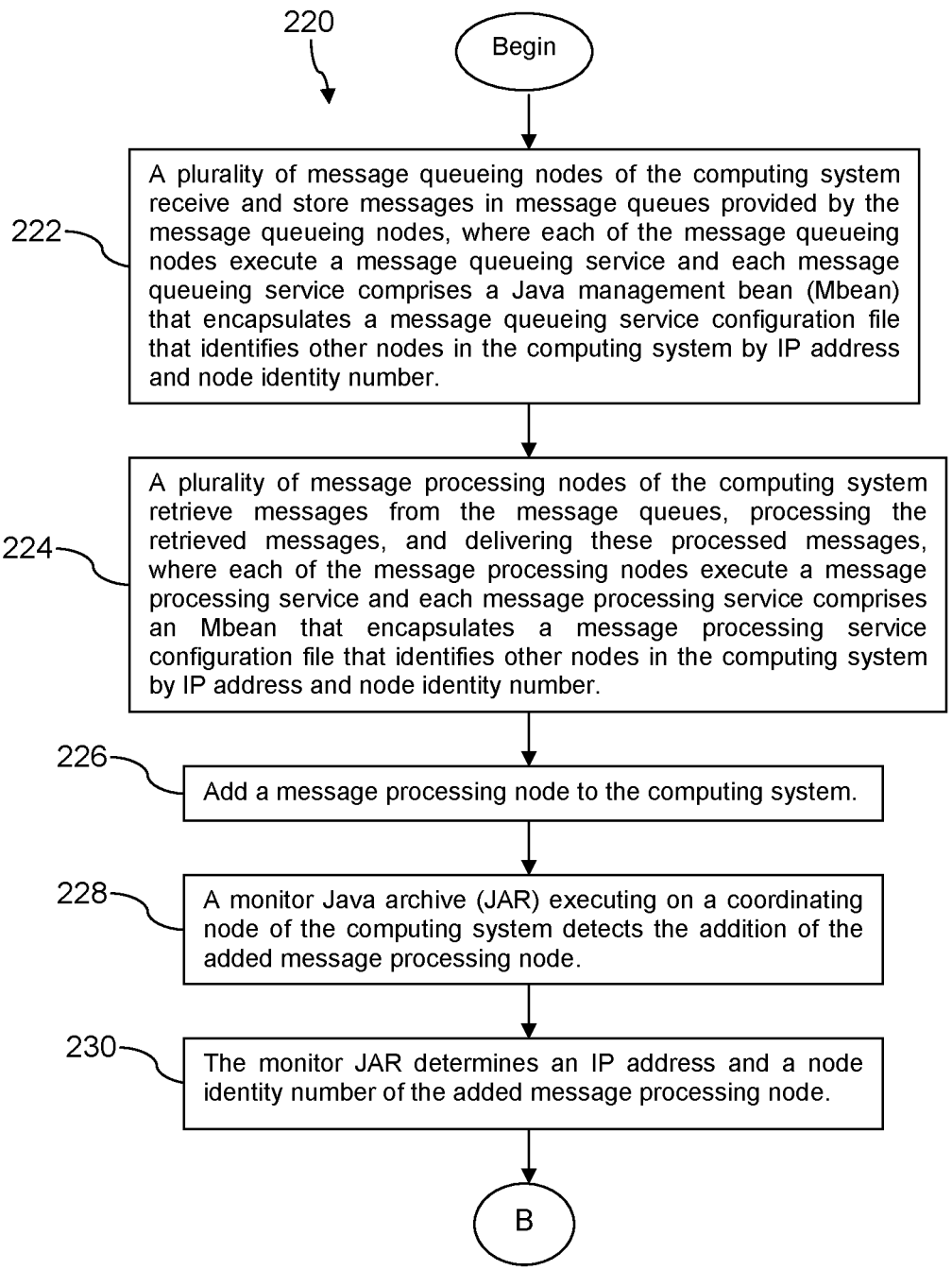
FIG. 3A and FIG. 3B are a flow chart of a method according to an embodiment of the disclosure.
Figure 3B:
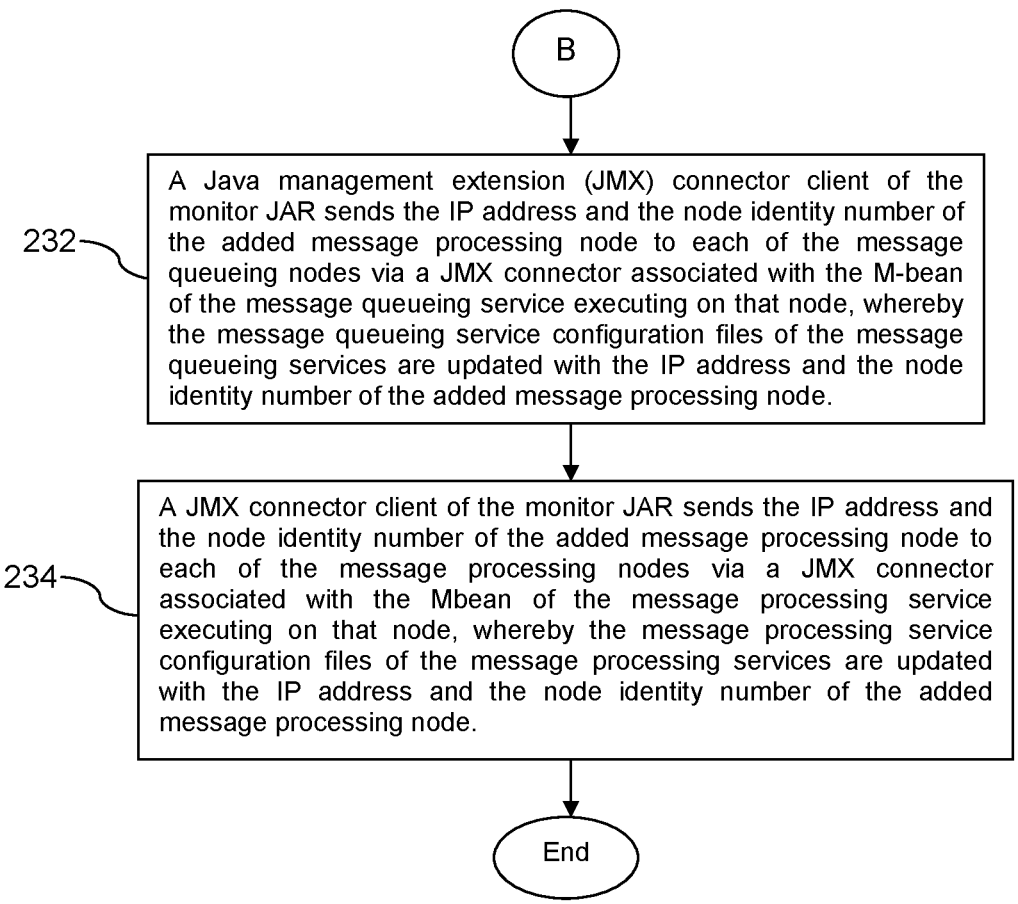

Turning now to FIG. 3A and FIG. 3B, a method 220 is described. At block 222, a plurality of message queuing nodes of the computing system receive and store messages in message queues provided by the message queuing nodes, where each of the message queuing nodes execute a message queuing service and each message queuing service comprises a Java management bean (MBean) that encapsulates a message queuing service configuration file that identifies other nodes in the computing system by IP address and node identity number. At block 224, a plurality of message processing nodes of the computing system retrieve messages from the message queues, processing the retrieved messages, and delivering these processed messages, where each of the message processing nodes execute a message processing service and each message processing service comprises an MBean that encapsulates a message processing service configuration file that identifies other nodes in the computing system by IP address and node identity number.

At block 226, add a message processing node to the computing system. At block 228, a monitor Java archive (JAR) executing on a coordinating node of the computing system detects the addition of the added message processing node. At block 230, the monitor JAR determines an IP address and a node identity number of the added message processing node At block 232, a Java management extension (JMX) connector client of the monitor JAR sends the IP address and the node identity number of the added message processing node to each of the message queuing nodes via a JMX connector associated with the MBean of the message queuing service executing on that node, whereby the message queuing service configuration files of the message queuing services are updated with the IP address and the node identity number of the added message processing node. At block 234, a JMX connector client of the monitor JAR sends the IP address and the node identity number of the added message processing node to each of the message processing nodes via a JMX connector associated with the M-bean of the message processing service executing on that node, whereby the message processing service configuration files of the message processing services are updated with the IP address and the node identity number of the added message processing node.

Figure 4A:
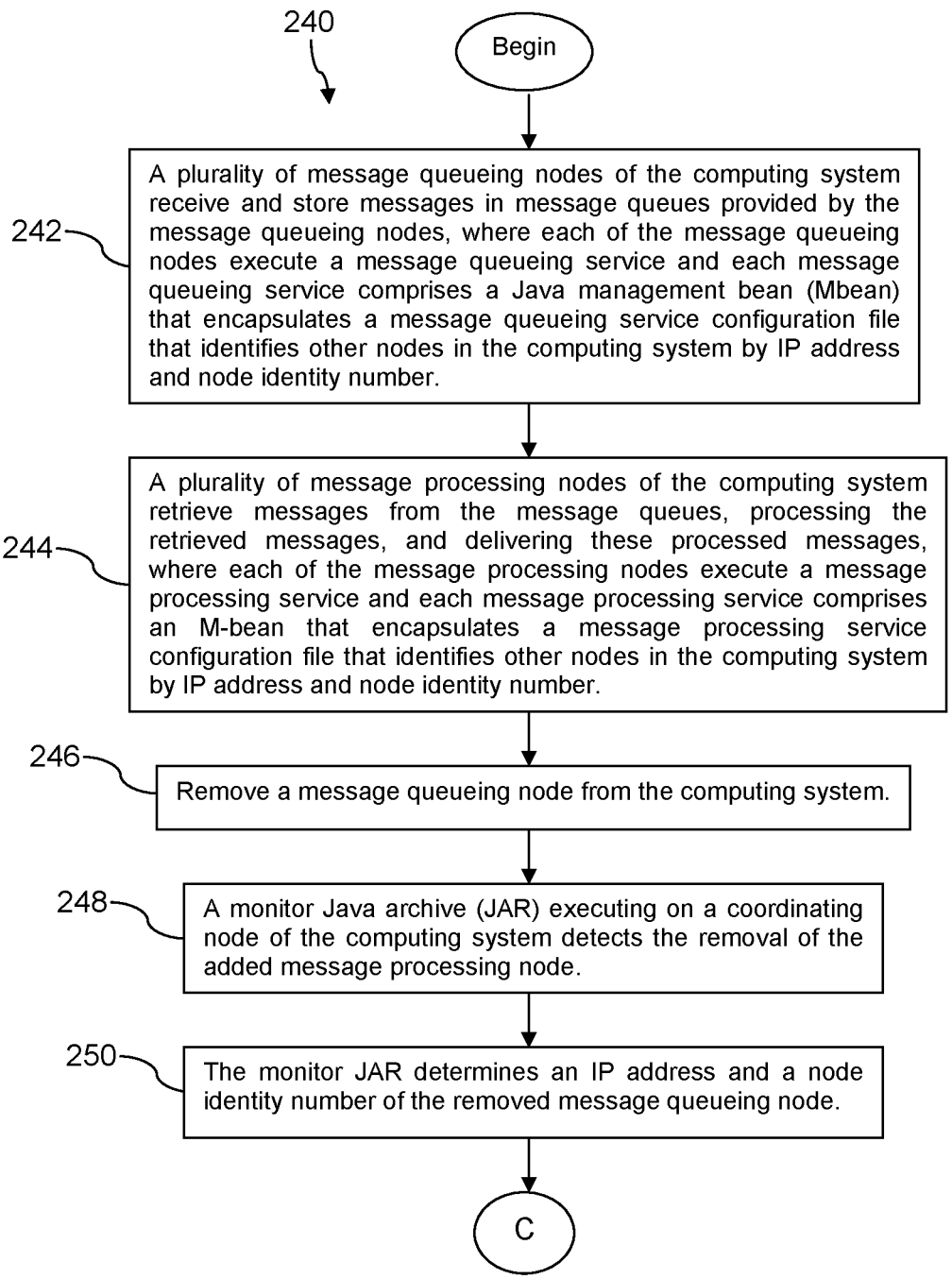
FIG. 4A and FIG. 4B are a flow chart of a method according to an embodiment of the disclosure.
Figure 4B:
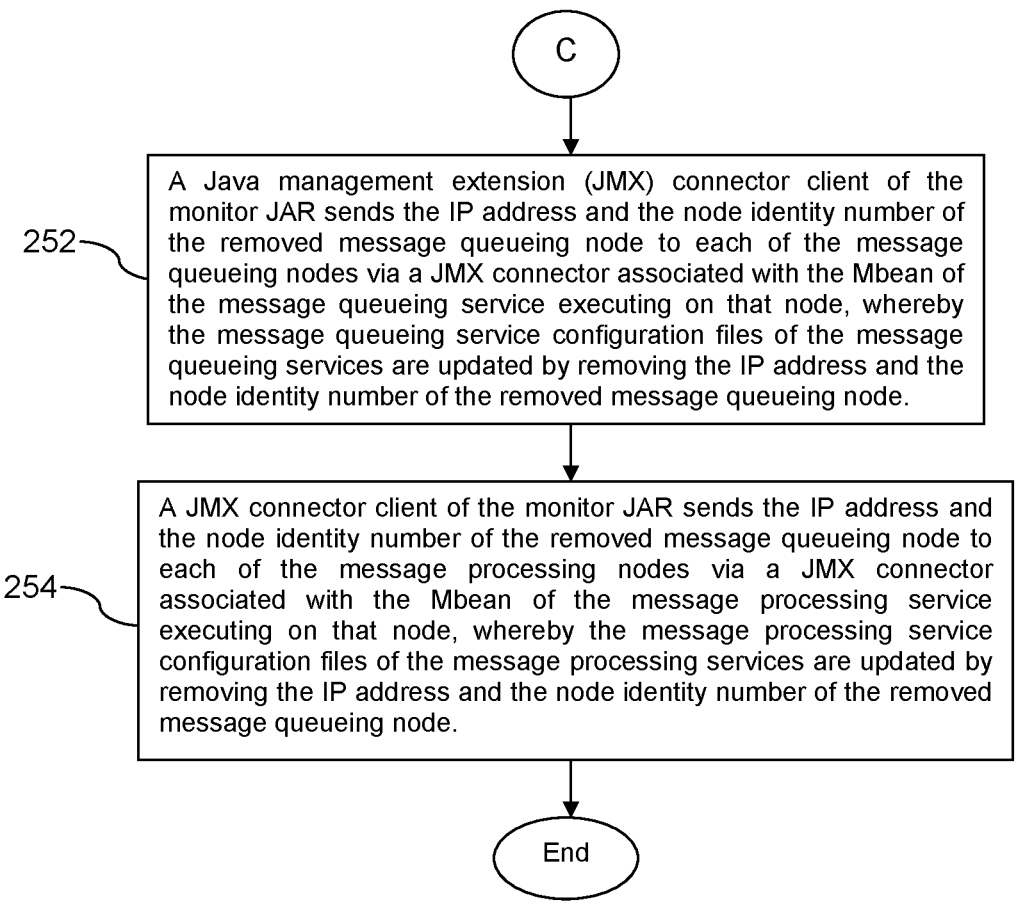

Turning now to FIG. 4A and FIG. 4B, a method 240 is described. At block 242, a plurality of message queuing nodes of the computing system receive and store messages in message queues provided by the message queuing nodes, where each of the message queuing nodes execute a message queuing service and each message queuing service comprises a Java management bean (MBean) that encapsulates a message queuing service configuration file that identifies other nodes in the computing system by IP address and node identity number. At block 244, a plurality of message processing nodes of the computing system retrieve messages from the message queues, processing the retrieved messages, and delivering these processed messages, where each of the message processing nodes execute a message processing service and each message processing service comprises an MBean that encapsulates a message processing service configuration file that identifies other nodes in the computing system by IP address and node identity number. At block 246, remove a message queuing node from the computing system.

At block 248, a monitor Java archive (JAR) executing on a coordinating node of the computing system detects the removal of the added message processing node. At block 250, the monitor JAR determines an IP address and a node identity number of the removed message queuing node.

At block 252, a Java management extension (JMX) connector client of the monitor JAR sends the IP address and the node identity number of the removed message queuing node to each of the message queuing nodes via a JMX connector associated with the MBean of the message queuing service executing on that node, whereby the message queuing service configuration files of the message queuing services are updated by removing the IP address and the node identity number of the removed message queuing node. At block 254, a JMX connector client of the monitor JAR sends the IP address and the node identity number of the removed message queuing node to each of the message processing nodes via a JMX connector associated with the M-bean of the message processing service executing on that node, whereby the message processing service configuration files of the message processing services are updated by removing the IP address and the node identity number of the removed message queuing node.

Figure 5:
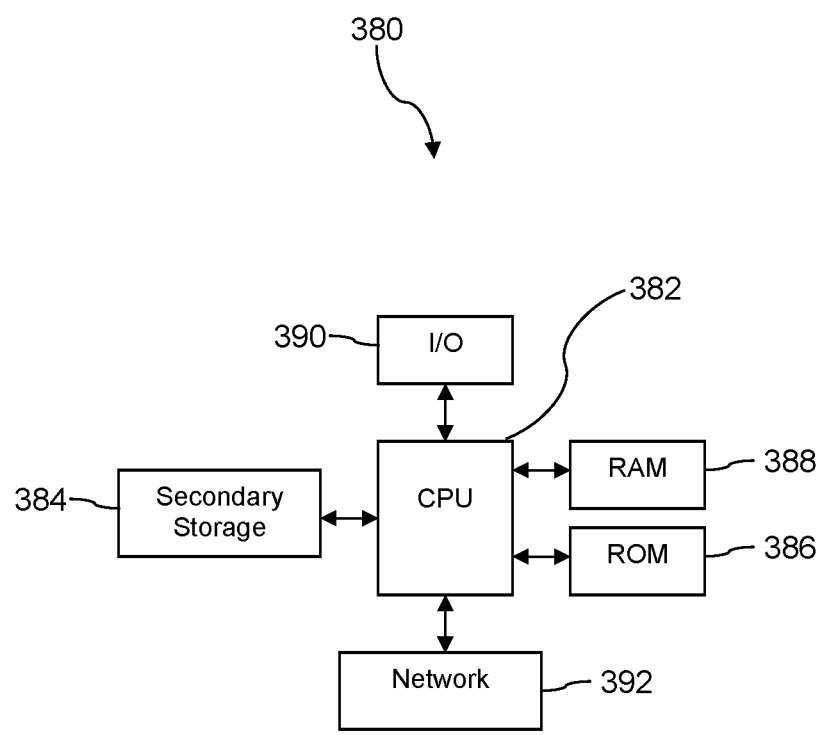
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of processing data messages in a computing system, comprising:

receiving messages by a plurality of message queuing nodes of the computing system and storing the messages in message queues provided by the message queuing nodes, where each of the message queuing nodes execute a message queuing service and each message queuing service comprises a Java management bean (MBean) that encapsulates a message queuing service configuration file that identifies other nodes in the computing system by IP address and node identity number;

retrieving messages from the message queues by a plurality of message processing nodes of the computing system, processing the retrieved messages, and delivering these processed messages, where each of the message processing nodes execute a message processing service and each message processing service comprises an MBean that encapsulates a message processing service configuration file that identifies other nodes in the computing system by IP address and node identity number;

adding a message queuing node to the computing system;

detecting the addition of the added message queuing node by a monitor Java archive (JAR) executing on a coordinating node of the computing system;

determining an IP address and a node identity number of the added message queuing node by the monitor JAR;

sending the IP address and the node identity number of the added message queuing node via a Java management extension (JMX) connector client of the monitor JAR to each of the message queuing nodes via a JMX connector associated with the MBean of the message queuing service executing on that node, whereby the message queuing service configuration files of the message queuing services are updated with the IP address and the node identity number of the added message queuing node; and sending the IP address and the node identity number of the added message queuing node via a JMX connector client of the monitor JAR to each of the message processing nodes via a JMX connector associated with the MBean of the message processing service executing on that node, whereby the message processing service configuration files of the message processing services are updated with the IP address and the node identity number of the added message queuing node, whereby a message queuing layer of the computing system is scaled up.

2. The method of claim 1, wherein the messages received by the message queuing nodes comprise information about events generated by mobile communication devices.

3. The method of claim 2, wherein the events comprise information about a blocked call attempt, a dropped call, a signal quality, and a cell site signal strength.

4. The method of claim 1, wherein processing the retrieved messages by the message processing nodes comprises generating counts, aggregating separate events into a single event, and storing events.

5. The method of claim 1, wherein the messaging queuing nodes execute a Kafka message queuing service.

6. The method of claim 1, wherein the message processing nodes execute a Storm processing service.

7. The method of claim 1, wherein the coordinating node executes a Zookeeper service.

8. A method of processing data messages in a computing system, comprising:

receiving messages by a plurality of message queuing nodes of the computing system and storing the messages in message queues provided by the message queuing nodes, where each of the message queuing nodes execute a message queuing service and each message queuing service comprises a Java management bean (MBean) that encapsulates a message queuing service configuration file that identifies other nodes in the computing system by IP address and node identity number;

retrieving messages from the message queues by a plurality of message processing nodes of the computing system, processing the retrieved messages, and delivering these processed messages, where each of the message processing nodes execute a message processing service and each message processing service comprises an MBean that encapsulates a message processing service configuration file that identifies other nodes in the computing system by IP address and node identity number;

adding a message processing node to the computing system;

detecting the addition of the added message processing node by a monitor Java archive (JAR) executing on a coordinating node of the computing system;

determining an IP address and a node identity number of the added message processing node by the monitor JAR;

sending the IP address and the node identity number of the added message processing node via a Java management extension (JMX) connector client of the monitor JAR to each of the message queuing nodes via a JMX connector associated with the MBean of the message queuing service executing on that node, whereby the message queuing service configuration files of the message queuing services are updated with the IP address and the node identity number of the added message processing node; and sending the IP address and the node identity number of the added message processing node via a JMX connector client of the monitor JAR to each of the message processing nodes via a JMX connector associated with the MBean of the message processing service executing on that node, whereby the message processing service configuration files of the message processing services are updated with the IP address and the node identity number of the added message processing node, whereby a message processing layer of the computing system is scaled up.

9. The method of claim 8, wherein the messages received by the message queuing nodes comprise information about events generated by mobile communication devices.

10. The method of claim 9, wherein the events comprise information about a blocked call attempt, a dropped call, a signal quality, and a cell site signal strength.

11. The method of claim 8, wherein processing the retrieved messages by the message processing nodes comprises generating counts, aggregating separate events into a single event, and storing events.

12. The method of claim 8, wherein the messaging queuing nodes execute a Kafka message queuing service.

13. The method of claim 8, wherein the message processing nodes execute a Storm processing service.

14. The method of claim 8, wherein the coordinating node executes a Zookeeper service.

15. A method of processing data messages in a computing system, comprising:

receiving messages by a plurality of message queuing nodes of the computing system and storing the messages in message queues provided by the message queuing nodes, where each of the message queuing nodes execute a message queuing service and each message queuing service comprises a Java management bean (MBean) that encapsulates a message queuing service configuration file that identifies other nodes in the computing system by IP address and node identity number;

retrieving messages from the message queues by a plurality of message processing nodes of the computing system, processing the retrieved messages, and delivering these processed messages, where each of the message processing nodes execute a message processing service and each message processing service comprises an MBean that encapsulates a message processing service configuration file that identifies other nodes in the computing system by IP address and node identity number;

removing a message queuing node or a message processing node from the computing system;

detecting the removal of the message queuing node by a monitor Java archive (JAR) executing on a coordinating node of the computing system;

determining an IP address and a node identity number of the removed message queuing node by the monitor JAR;

sending the IP address and the node identity number of the removed message queuing node via a Java management extension (JMX) connector client of the monitor JAR to each of the remaining message queuing nodes via a JMX connector associated with the MBean of the message queuing service executing on that node, whereby the message queuing service configuration files of the message queuing services are updated by removing the IP address and the node identity number of the removed message queuing node; and sending the IP address and the node identity number of the removed message queuing node via a JMX connector client of the monitor JAR to each of the message processing nodes via a JMX connector associated with the MBean of the message processing service executing on that node, whereby the message processing service configuration files of the message processing services are updated by removing the IP address and the node identity number of the removed message queuing node, whereby a message queuing layer of the computing system is scaled down.

16. The method of claim 15, wherein the messages received by the message queuing nodes comprise information about events generated by mobile communication devices.

17. The method of claim 16, wherein the events comprise information about a blocked call attempt, a dropped call, a signal quality, and a cell site signal strength.

18. The method of claim 15, wherein processing the retrieved messages by the message processing nodes comprises generating counts, aggregating separate events into a single event, and storing events.

19. The method of claim 15, wherein the messaging queuing nodes execute a Kafka message queuing service.

20. The method of claim 15, wherein the message processing nodes execute a Storm processing service.

* * * * *